(12) United States Patent
Mitchell et al.

(10) Patent No.: US 8,386,758 B1
(45) Date of Patent: Feb. 26, 2013

(54) SYSTEM AND METHOD OF ENABLING CODEC DEVICE FEATURES

(75) Inventors: Victoria B. Mitchell, Austin, TX (US);
Ryan Paul Harvey, Austin, TX (US);
Ronald Jay Lisle, Cedar Park, TX (US);
Vitaliy I. Kulikov, Austin, TX (US)

(73) Assignee: Integrated Device Technology, inc., San Jose, CA (US)

( * ) Notice: Subject to any disclaimer, the term of this patent is extended or adjusted under 35 U.S.C. 154(b) by 672 days.

(21) Appl. No.: 12/511,985

(22) Filed: Jul. 29, 2009

(51) Int. Cl.
*G06F 9/24* (2006.01)
*G06F 15/177* (2006.01)

(52) U.S. Cl. .................... 713/1; 713/2; 713/100; 710/8; 710/10; 710/62; 710/72

(58) Field of Classification Search .................. 713/1, 2, 713/100; 710/8, 10, 62, 72
See application file for complete search history.

(56) References Cited

U.S. PATENT DOCUMENTS

| | | | |
|---|---|---|---|
| 6,973,512 B1* | 12/2005 | Koeman | 710/38 |
| 7,810,103 B2* | 10/2010 | Shier et al. | 719/321 |
| 2007/0079033 A1* | 4/2007 | Kim et al. | 710/105 |
| 2009/0006704 A1* | 1/2009 | Gough et al. | 710/305 |

* cited by examiner

*Primary Examiner* — Kim Huynh
*Assistant Examiner* — Michael J Brown
(74) *Attorney, Agent, or Firm* — Kenneth Glass; Stanley J. Pawlik; Glass & Associates

(57) ABSTRACT

A computing system includes a codec device, a basic input-output system including both configuration data and feature data for the codec device, and a device driver for the codec device. The basic input-output system configures the codec device based on the configuration data. The device driver reads the feature data from the basic input-output system and enables one or more features of the codec device based on the feature data. In various embodiments, the device driver is WHQL certified and is included in an automated operating system upgrade of the computing system. Because the feature data is in the basic input-output system, the feature data is preserved during the operating system upgrade of the computing system. In some embodiments, the device driver enables one or more features of an application program based on the feature data.

17 Claims, 6 Drawing Sheets

SYSTEM AND METHOD OF ENABLING CODEC DEVICE FEATURES

BACKGROUND

A personal computer typically includes an audio codec for encoding and decoding digital audio streams. A device driver is coded specifically for the audio codec to control operation of the audio codec in the personal computer. The device driver is then included in a device driver installation package for the audio codec. In turn, the device driver is installed in an operating system of the personal computer when the operating system executes the device driver installation package. In addition to controlling operation of the audio codec, the device driver facilitates communication between the audio codec and the operating system of the personal computer.

For a personal computer including a Microsoft Windows™ operating system, a device driver for an audio codec in the personal computer is typically certified through Windows Hardware Quality Laboratories (WHQL). In this certification process, the device driver is tested for compatibility with an audio subsystem of the operating environment, including related components, drivers, hardware, etc. If the device driver passes tests specified by the Windows Hardware Qualify Laboratories, Microsoft creates a digitally signed certification file for the device driver. The digitally signed certification file is then included in a device driver installation package for the audio codec. Moreover, the digitally signed certification file prevents a Windows operating system from displaying a message indicating that the device driver in the device driver installation package has not been certified by Microsoft for performance and quality metrics.

An original equipment manufacturer (OEM) of personal computers may desire to customize features of an audio codec available to a device driver of the audio codec and obtain WHQL certification of the customized device driver. One technique employed for customizing features of an audio codec available to a device driver involves specifying selected features of the audio codec in an installation configuration file to enable the selected features for the device driver. The installation configuration file is then included in the device driver installation package and WHQL certification is obtained for the device driver installation package. In this way, WHQL certification is also obtained for the device driver in the device driver installation package. Although this technique has been successfully employed to customize features of an audio codec and obtain WHQL certification of a device driver for the audio codec, WHQL certification is individually obtained for each device driver installation package including a unique installation configuration file, which may be costly and time consuming.

Another technique for customizing features of an audio codec available to a device driver involves specifying selected features of the audio codec in a configuration file independent from a device driver, and then obtaining WHQL certification of the device driver package without the configuration file. Because the configuration file is not part of the device driver installation package, WHQL certification need not be obtained for each unique combination of selected features specified in the configuration file. Although this technique has been successfully employed to customize features of an audio codec and obtain WHQL certification of a device driver for the audio codec, the independent configuration file is typically omitted in an automated Windows operating system upgrade performed on the personal computer. For instance, the automatic operating system upgrade may replace an older version of the Windows operating system on the personal computer with a newer version of the Windows operating system not including the configuration file.

If the configuration file is omitted in the automated operating system upgrade, the configuration file is typically installed in the personal computer in a separate, manual process after completion of the automated operating system upgrade to enable the selected features of the audio codec specified in the configuration file. For convenience and to avoid human error or upgrade failure, it is desirable to include the configuration file in the automated operating system upgrade, which occurs when the configuration file is included in a WHQL certified device driver of the audio codec.

In light of the above, a need exists for customizing features of a codec without requiring certification of multiple device driver packages for the codec. A further need exists for customizing features of a codec without modifying a certified device driver installation package including a device driver for the audio codec. A need also exists for retaining customized features of a codec contained in a computing device during an operating system upgrade performed on the computing device.

SUMMARY

In various embodiments, a computing system includes a codec device, a basic input-output system (BIOS), and an operating system (OS) that employs a device driver to operate the codec device according to specified features and configuration options. The computing system executes the BIOS during a restart of the computing system and the BIOS configures the codec device based on configuration data in the BIOS. The operating system loads the device driver which then reads feature data from the BIOS and enables a feature of the codec device based on the feature data. In some embodiments, the device driver enables a feature of an application program by writing application data to a software component (e.g., middleware) of the computing system based on the feature data. In turn, an application program accesses the application data in the software component and enables the feature in the application program.

In further embodiments, the device driver is verified by the Windows Hardware Quality Laboratories (WHQL) and is deemed to be WHQL certified. Because the device driver is WHQL certified, the device driver is automatically migrated from an older version of the Windows OS on the computing system to a newer version of the Windows OS in an automated Windows operating system upgrade performed on the computing system. Moreover, because the configuration data and the feature data of the codec device are stored in the BIOS, which is not affected by the Windows upgrade, the device driver in the newer version of the Windows OS may configure the codec device based on the configuration data stored in the BIOS and enable features of the codec device available to the device driver based on the feature data in the BIOS. In this way, WHQL certification of the device driver is preserved in the operating system upgrade and both the configuration data and the feature data are preserved in the operating system upgrade. Moreover, features of the codec device may be selectively enabled for the device driver by modifying the feature data without invalidating the WHQL certification of the device driver.

A computing system, in accordance with one embodiment, includes a codec device, a memory system, and a computing processor coupled to the codec device and the memory system. The memory system is configured to store a basic input-output system including both configuration data and feature data for the codec device. The memory system is further configured to store a device driver for the codec device. The computing processor is configured to execute the basic input-output system and the device driver. The basic input-output system is configured to configure the codec device based on the configuration data. The device driver is configured to read the feature data from the basic input-output system and enable a feature of the codec device based on the feature data.

A method of enabling a feature of a codec device, in accordance with one embodiment, includes configuring a codec device based on the configuration data of a basic input-output system. The method further includes reading feature data from the basic input-output system by a device driver and enabling a feature of the codec device by the device driver based on the feature data.

A method of testing a WHQL certified device driver for a codec device, in accordance with one embodiment, includes generating a test file including both configuration data and feature data for a codec device. The method further includes testing a device driver for the codec device by emulating a basic input-output system by the device driver based on the configuration data in the test file to configure the codec device and by enabling a feature of the codec device by the device driver based on the feature data in the test file. In further embodiments, the method includes generating the basic input-output system including the configuration data and the feature data, and comparing the configuration data and the feature data in the basic input-output system with the configuration data and the feature data in the test file.

A computer readable media, in accordance with one embodiment, includes computing instructions readable by a computing system including a basic input-output system and a codec device. The computing instructions are executable by the computing system to perform a method of configuring the codec device based on the configuration data in the basic input-output system, reading feature data from the basic input-output system by a device driver, and enabling a feature of the codec device by the device driver based on the feature data.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a basic input-output system (BIOS) configures a codec device in a computing system based on configuration data in the BIOS. Additionally, a device driver reads feature data from the BIOS and enables a feature of the codec device based on the feature data. In some embodiments, the device driver generates application data for enabling a feature of an application program based on the feature data and writes the application data to a software component commonly referred to as middleware. The application program accesses the application data in the software component and enables the feature of the application program based on the application data. Because the configuration data and the feature data for the codec are stored in the BIOS instead of an operating system (OS) file or a device driver installation package, the device driver may be migrated from one operating system to another operating system during an automated OS upgrade of the computing system without requiring a separate process for reinstalling the configuration data and the feature data in the computing system.

Figure 1:
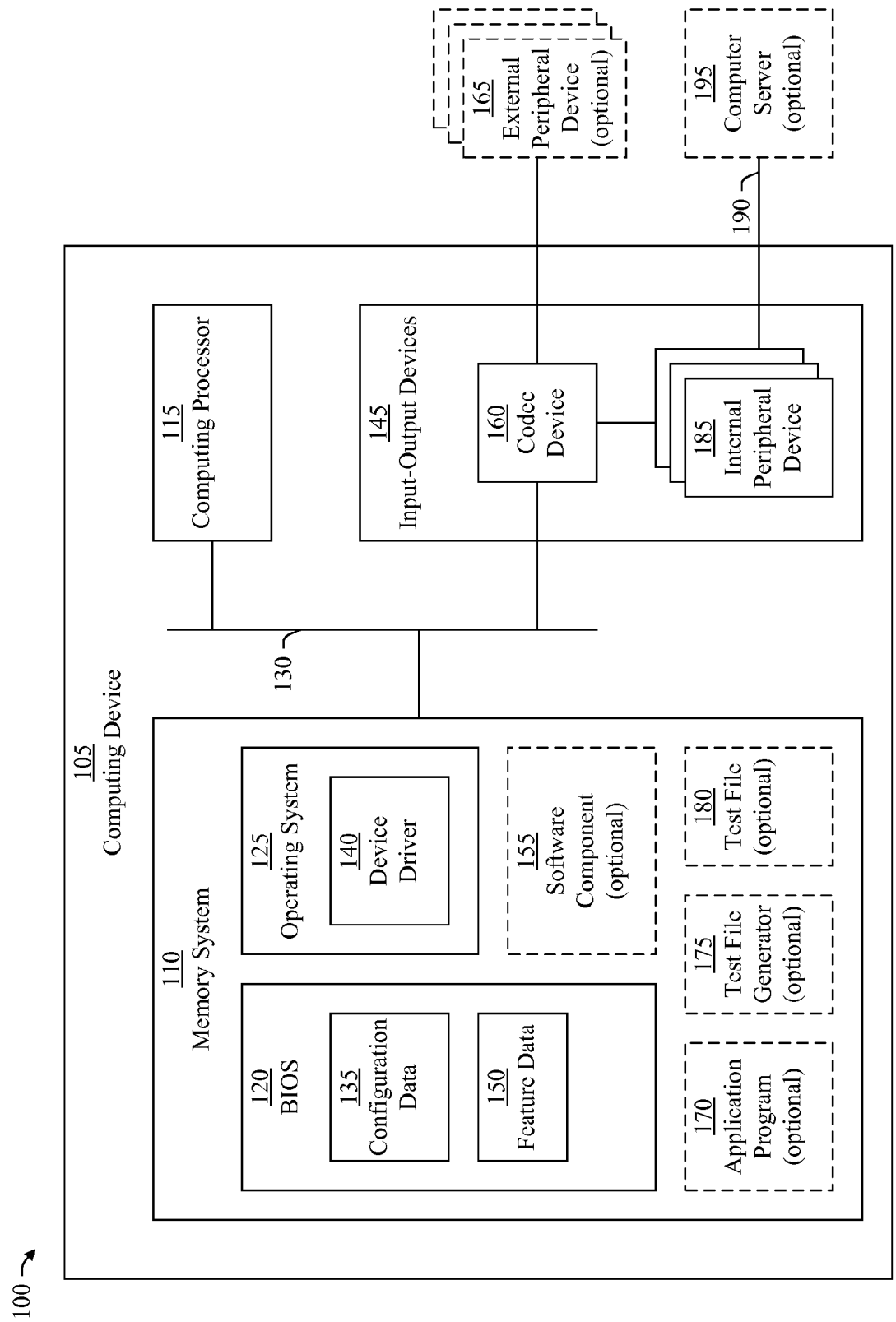
FIG. 1 is a block diagram of a computing system, in accordance with an embodiment of the present invention.

FIG. 1 illustrates a computing system 100, in accordance with an embodiment of the present invention. The computing system 100 includes a computing device 105 and one or more optional external peripheral devices 165 coupled (e.g., connected) to the computing device 105. The computing device 105 may be any system or device for processing data, such as a portable computer or a desktop computer. The computing device 105 includes a memory system 110, a computing processor 115, a computer bus 130, and input-output devices 145. The computer bus 130 is coupled (e.g., connected) to the computing processor 115, the memory system 110, and the input-output devices 145 for facilitating communication among the computing processor 115, the memory system 110, and the input-output devices 145. In various embodiments, the computing device 105 is a multimedia computing device.

In various embodiments, the memory system 110 includes one or more volatile memory devices, such as a random-access memory (RAM), and one or more nonvolatile memory devices, such as a read-only memory (ROM) or hard drive. In operation, the memory system 110 stores a basic input-output system (BIOS) 120, an operating system 125 (e.g., a user operating system), an optional software component 155, an optional application program 170, an optional test file generator 175, and an optional test file 180, each of which is described more fully herein. In various embodiments, the operating system 125 is a version of the Windows operating system available from the Microsoft Corporation of Redmond, Wash.

The input-output devices 145 include a codec device 160 and one or more internal peripheral devices 185 coupled (e.g., connected) to the codec device 160. The codec device 160 may be any device for encoding or decoding a digital data stream or digital data signal. In various embodiments, the codec device 160 is an audio codec device capable of encoding and encoding digital audio data streams or digital audio signals, or both. In some embodiments, the codec device 160 is an audio codec compliant with a version of the High Definition Audio specification (HDA) developed by the Intel Corporation of Santa Clara, Calif. The internal peripheral device 185 may be any system or device for receiving input or generating output for the computing device 105 and contained in an enclosure housing the computing device 105.

In embodiments including an external peripheral device 165, the codec device 160 may be coupled (e.g., connected) to the external peripheral device 165. The external peripheral device 165 may be any system or device for receiving input or generating output for the computing device 105 and located outside an enclosure housing the computing device 105. For example, the external peripheral device 165 may be an audio input device for providing an audio data stream to the codec device 160, such as an external microphone, or an audio output device for receiving an audio data stream from the codec device 160, such as an external speaker system.

As illustrated in FIG. 1, the operating system 125 includes a device driver 140 for the codec device 160. The device driver 140 controls operation of the codec device 160 and facilitates communication between the operating system 125 and the codec device 160. In some embodiments, the device driver 140 is compliant with a version of the Universal Audio Architecture initiative (UAA) developed by the Intel Corporation of Santa Clara, Calif. As also illustrated in FIG. 1, the BIOS 120 includes configuration data 135 for configuring the codec device 160 and feature data 150 for enabling one or more features of the codec device 160 for the device driver 140.

In various embodiments, the device driver 140 is certified by the Windows Hardware Quality Laboratories (WHQL) and thus has WHQL certification. In further embodiments, the device driver 140 is migrated from one version of a Windows operating system (e.g., the operating system 125) stored in the memory system 110 to another version of the Windows operating system (e.g., the operating system 125) during an automated operating system upgrade performed on the computing device 105. Because the feature data 150 is stored in the BIOS 120, the feature data 150 remains in the memory system 110 during the operating system upgrade. As a result, the computing device 105 may enable one or more features of the codec device 160 for the device driver 140 based on the feature data 150 after the operating system upgrade without reinstalling the feature data 150 in the computing device 105. Moreover, the feature data 150 may be modified to selectively enable features of the codec device 160 accessible to the device driver 140 without losing WHQL certification of the device driver 140.

In various embodiments, the computing processor 115 executes the BIOS 120 upon a restart of the computing device 105, for example a reset or reboot of the computing device 105. In this process, the BIOS 120 configures the codec device 160 by storing the configuration data 135 into the codec device 160. The computing processor 115 then executes the operating system 125 including the device driver 140. In this process, the device driver 140 enables one or more features of the codec device 160 based on the feature data 150. In various embodiments, the feature data 150 is contained in a data structure stored in the BIOS 120. Moreover, the computing processor 115 executes the device driver 140 to locate the data structure containing the feature data 150 in the BIOS 120. In one embodiment, the computing processor 115 executes the device driver 140 to access a pointer in the BIOS 120 identifying the location of the data structure in the BIOS 120. In another embodiment, the computing processor 115 executes the device driver 140 to search for an identifier in the BIOS 120 identifying the location of the data structure in the BIOS 120. For example, the identifier may be a predetermined character string in the BIOS 120 identifying the location of the data structure in the BIOS 120.

The computing processor 115 further executes the device driver 140 to enable one or more features of the codec device 160 for the device driver 140. For example, a feature of the codec device 160 may be an echo cancellation device or an audio equalization device in the codec device 160. As another example, a feature of the codec device 160 may be overloading the codec device 160 to perform multiple alternative functions. In some embodiments, the overloading feature of the codec device 160 is an extension of the HDA or the UAA, or both. For example, the HDA provides for only a single default configuration for each pin device of an audio codec. In various embodiments, the codec device 160 includes pin devices supporting multiple configurations and the device driver 140 selects one or more of the configurations as a feature of the codec device 160, as is described more fully herein.

In some embodiments, the computing processor 115 executes the device driver 140 to generate application data based on the feature data 150 and stores the application data in the software component 155. In one embodiment, the operating system 125 is a Windows operating system and the software component 155 includes registry keys of the Windows operating system. In this embodiment, the computing processor 115 stores the application data as one or more registry keys of the Windows operating system. In this way, the computing processor 115 exposes the feature data 150 to higher level programs stored in the memory system 110, such as the application program 170. In some embodiments, the application data stored in the software component 155 is the same as the feature data 150.

In another embodiment, the device driver 140 stores the application data in the memory system 110 and exposes the application data to an operating system interface. For example, the operating system interface may be an input-output-control (ioctl) of a user-to-kernel interface of the operating system 125, which is accessible to the computing processor 115 through a system call to the operating system 125. In this way, the device driver 140 exposes the feature data 150 in the BIOS 120 to higher level programs stored in the memory system 110, such as the application program 170.

In embodiments including the application program 170, the computing processor 115 executes the application program 170 to access the application data in the software component 155 and enable one or more features of the application program 170 based on the application data. In this way, the application program 170 enables one or more features of the application program 170 based on the feature data 150. In various embodiments, the features of the application program 170 are related to operation of the codec device 160. For example, the application program 170 may include a graphical user interface (GUI) having a control panel for controlling the codec device 160. In this example, the feature of the application program 170 may be a skin for the control panel or a logo displayed on the control panel. In this way, the feature data 150 is used to customize features enabled in the application program 170.

In some embodiments, the application data includes geometric properties of microphones or speakers in the computing device 105, or both. In these embodiments, an application program 170 performs audio processing functions, such as beam forming, based on the application data. In some embodiments, the application data includes default configuration data for controls in a control panel in an application program 170. For example, the default states may include a default volume level, a default acoustic-echo-suppression (AES) level, a default noise suppression/cancellation (NS) level, or the like.

In some embodiments, the memory system 110 stores a test file generator 175 and a test file 180. The test file generator 175 generates the test file 180, for example based on user input. In some embodiments, the test file generator 175 is a text editor or a word processing program. In other embodiments, the test file generator 175 is a web based application program. For example, the test file generator 175 may be located in the computer server 195. In these embodiments, the test file 180 includes the configuration data 135 and the feature data 150. In these embodiments, functionality of the device driver 140 is extended to read the configuration data 135 and the feature data 150 from the test file 180, configure the codec device 160 based on the configuration data 135, and enable a feature of the codec device 160 based on the feature data 150. Moreover, the device driver 140 instead of the BIOS 120 reads the configuration data 135 from the test file 180 and configures the codec device 160 based on the configuration data 135. Additionally, the device driver 140 accesses the feature data 150 from the test file 180 instead of the BIOS 120 and enables one or more features of the codec device 160 for the device driver 140 based on the feature data 150. In this way, the device driver 140 tests operation of the device driver 140 on the codec device 160 by emulating operation of the BIOS 120 and enabling a feature of the codec device 160. In further embodiments, the device driver 140 tests operation of the device driver 140 on the codec device 160 by determining whether the feature of the device driver 140 operates according to specification.

In operation, the computing device 105 may execute the device driver 140 upon startup or based on input from a user of the computing device 105. Typically, the user of the computing device 105 is a system designer working for a manufacturer of the computing device 105. In some embodiments, the device driver 140 compares the configuration data 135 and the feature data 150 in the BIOS 120 with the configuration data 135 and the feature data 150 in the test file 180 to determine whether the BIOS 120 has been correctly generated to include the configuration data 135 and the feature data 150. If the device driver 140 determines the configuration data 135 and the feature data 150 in the BIOS 120 is the same as the configuration data 135 and the feature data 150 in the test file 180, the BIOS 120 is deemed to be valid. In this way, the device driver 140 validates the BIOS 120.

In further embodiments, the device driver 140 exposes the configuration data 135 or the feature data 150, or both, to the software component 155 (e.g., middleware) or the application program 170. In some embodiments, the software component 155 compares the configuration data 135 and the feature data 150 in the BIOS 120 with the configuration data 135 and the feature data 150 in the test file 180 to validate the BIOS 120. In some embodiments, the application program 170 compares the configuration data 135 and the feature data 150 in the BIOS 120 with the configuration data 135 and the feature data 150 in the test file 180 to validate the BIOS 120.

If the device driver 140 operates according to specification based on the configuration data 135 and the feature data 150 in the test file 180, the test performed on the device driver 140 is deemed to have passed the test. Otherwise, the test performed on the device driver 140 is deemed to have failed. In some embodiments, the device driver 140 determines whether the device driver 140 operates according to specification based on the configuration data 135 and the feature data 150 in the test file 180. In this way, the device driver 140 determines whether the test passes or fails. For example, the device driver 140 may display a message on a display device of the computing device 105 indicating whether the test performed by the device driver 140 passed or failed.

If the test performed by the device driver 140 fails, the user may run the test file generator 175 to modify the configuration data 135 or the feature data 150 in the test file 180, or both. For example, a user may provide input to the test file generator 175 and the test file generator 175 may modify the test file 180 based on the user input. The user then provides input to the computing device 105 or the device driver 140, and the device driver 140 performs the test on the modified test file 180 in response to the user input. Otherwise, if the test performed by the device driver 140 on the test file 180 passes, the user may run the test file generator 175 to generate computing code (e.g., source code) for the BIOS 120 including the configuration data 135 and the feature data 150. Additionally, the user may run a compiler to compile the source code into binary code and store the BIOS 120 (i.e., the binary code) in the memory system 110 of the computing device 105. For example, the memory system 110 may include a nonvolatile memory, such as a read-only memory (ROM), an erasable programmable read-only memory (EPROM), an electrically erasable programmable read-only memory (EEPROM), a flash memory, or the like for storing the BIOS 120. In some embodiments, the test file generator 175 generates source code for the BIOS 120 and compiles the computing code into the binary code of the BIOS 120, based on user input. In some embodiments, the test file generator 175 stores the BIOS 120 in a nonvolatile memory for use in the memory system 110, based on user input. In some embodiments, a user of the computing device 105 executes a programmer, such as an EEPROM programmer or a flash programmer, for storing the BIOS 120 (i.e., the binary code) in the memory system 110.

In some embodiments, the computing system 100 includes an optional communication link 190 and an optional computer server 195 coupled to the computing device 105 through the communication link 190. The computer server 195 may be any computing system or computing device for providing information to the computing device 105 through the communication link 190. The communication link 190 may be any wired or wireless communication link for transmitting information from the computer server 195 to the computing device 105. For example, the computer server 195 may be a Web server and the communication link 190 may be the Internet. As another example, the communication link 190 may be a local area network and the computer server 195 may be another computing device 105 on the local area network.

In various embodiments, the computer server 195 provides computing code to the computing device 105 through the communication link 190. For example, the computer server 195 may transmit the device driver 140, the software component 155, the application program 170, the test file generator 175, or the test file 180, or some combination thereof, to the computing device 105 through the communication link 190. In some embodiments, the computing processor 115 of the computing device 105 executes the computing code received from the computer server 195. For example, the computing system 100 may be a network computing system. In some embodiments, the computing processor 115 of the computing device 105 writes the computing code received from the computer server 195 into the memory system 110. In these embodiments, the computing processor 115 then reads the computing code from the memory system 110 and executes the computing code.

In various embodiments, computing instructions (e.g., computing code) of the device driver 140, the software component 155, the application program 170, the test file generator 175, or the test file 180, or some combination thereof, are stored on a computer readable media. In these embodiments, the computer readable media is referred to herein as a computer program product. The computer program product may be a portion of the memory system 110 or a portion of the computer server 195. In some embodiments, the computer program product is a removable computer readable media. In these embodiments, the removable computer readable media may be selectively attached and detached to the computing device 105 or the computer server 195.

In various embodiments, the computer program product may be a volatile media, a nonvolatile media, or a communication media. Examples of the nonvolatile media include an optical disk, a magnetic disk, a compact disc read-only-memory (CD-ROM), a digital versatile disk (DVD), a read-only memory (ROM), an erasable programmable read-only memory (EPROM), an electrically erasable programmable read-only memory (EEPROM), and a flash memory. Examples of the volatile media include a dynamic random-access memory (DRAM) and a static random-access memory (SRAM). In some embodiments, the computer readable media is the computing device 105. In some embodiments, the computer readable media is the computer server 195.

The communication media is a form of computer readable media delivered through the communication link 190 and contains computing instructions (e.g., computing code) of the device driver 140, the software component 155, the application program 170, the test file generator 175, or the test file 180, or some combination thereof. Examples of a communication media include a data structure, a computer file, and a program module. In various embodiments, computing instructions (e.g., computing code) in the communication media are stored in the computing device 105 upon delivery of the communication media to the computing device 105. In some embodiments, the communication media is stored in one or more intermediate computing systems or computing devices during delivery of the communication media to the computing device 105. For example, the communication media may be stored in multiple computer servers 195 connected to the communication link 190 during delivery of the communication media to the computing device 105.

Figure 2:
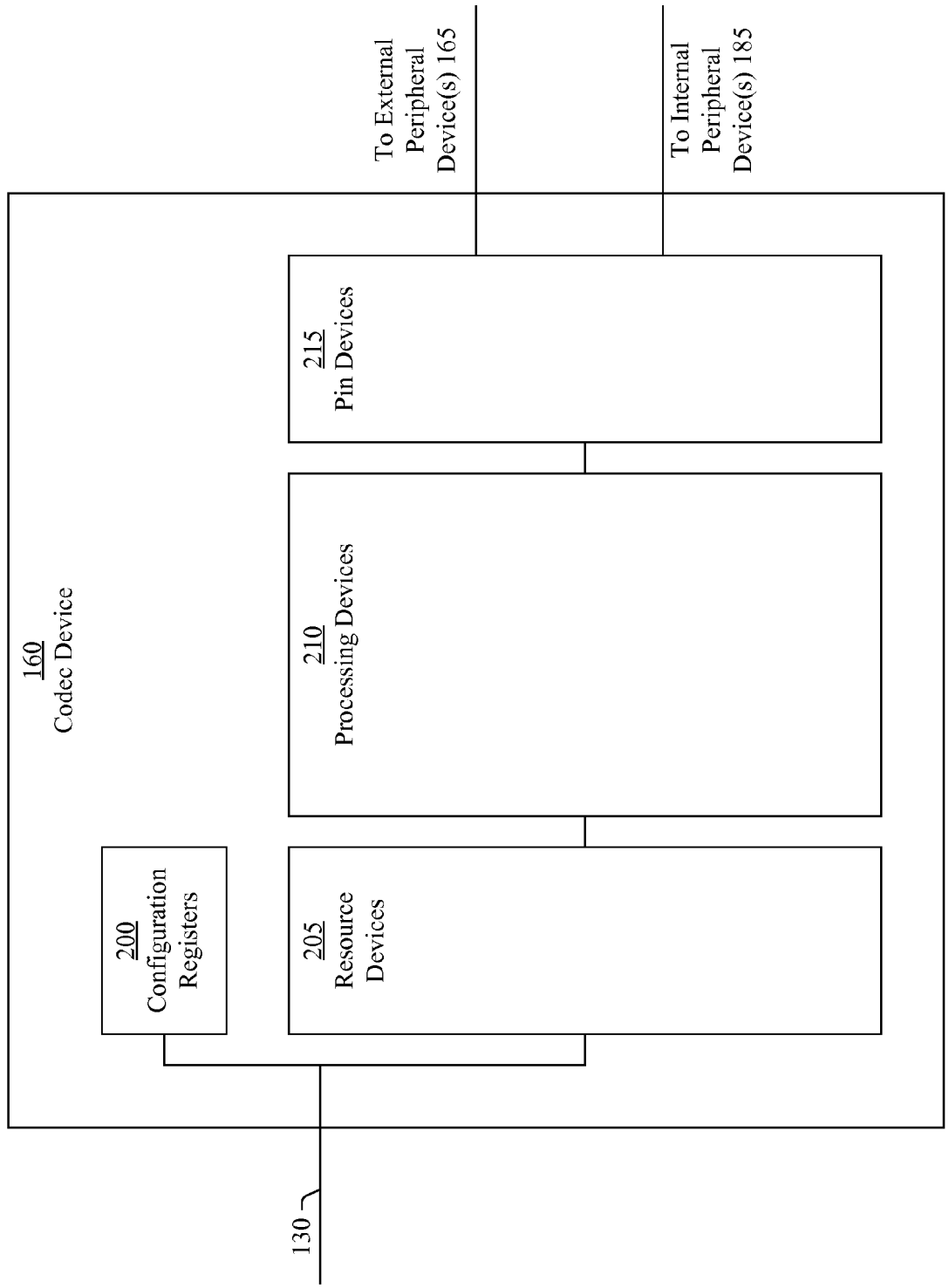
FIG. 2 is a block diagram of a codec device, in accordance with an embodiment of the present invention.

FIG. 2 illustrates the codec device 160, in accordance with an embodiment of the present invention. The codec device 160 includes configuration registers 200, resource devices 205, processing devices 210, and pin devices 215. The configuration registers 200 and the resource devices 205 are coupled (e.g., connected) to the computer bus 130. In various embodiments, the computing processor 115 executes the BIOS 120 to configure the codec device 160 by writing the configuration data 135 into the configuration registers 200. In this process, the computing processor 115 defines a function of the pin devices 215, connections between the resource devices 205 and the processing devices 210, and connections between the processing devices 210 and the pin devices 215. The connections between the resource devices 205 and the processing devices 210 as well as the connections between the processing devices 210 and the pin devices 215 define data paths in the codec device 160 from the resource devices 205 to the pin devices 215.

In various embodiments, the resource devices 205 convert digital data to analog data and convert analog data to digital data. The processing devices 210 process digital data or analog data, or both. The pin devices 215 communicate with one or more peripheral devices (e.g., the external peripheral devices 165 or the internal peripheral devices 185, or both) for transmitting digital data or analog data between the pin devices 215 and the peripheral devices. For example, a pin device 215 may be a microphone input jack, a line input jack, a line output jack, an auxiliary audio input jack, an auxiliary audio output jack, or the like.

In some embodiments, the computing processor 115 writes the configuration data 135 into the configuration registers 200 to indicate existence of a pin device 215, indicate whether a pin device 215 is connected to a processing device 210, indicate a physical location of a pin device 215 in the computing device 105, indicate a function of the pin device 215, define logical devices including more than one pin device 215, or indicate a function of a pin device 215, or some combination thereof. Further, the computing processor 115 may write the configuration data 135 into the configuration registers 200 to indicate a color for a pin device 215, indicate whether a function of a pin device 215 includes circuitry for overriding the function, indicate an association of pin devices 215, or indicate a sequence of pin devices 215 in an association, or some combination thereof. For example, the computing processor 115 may write the configuration data 135 into the configuration registers 200 to configure the codec device 160 according to the HDA.

Figure 3:
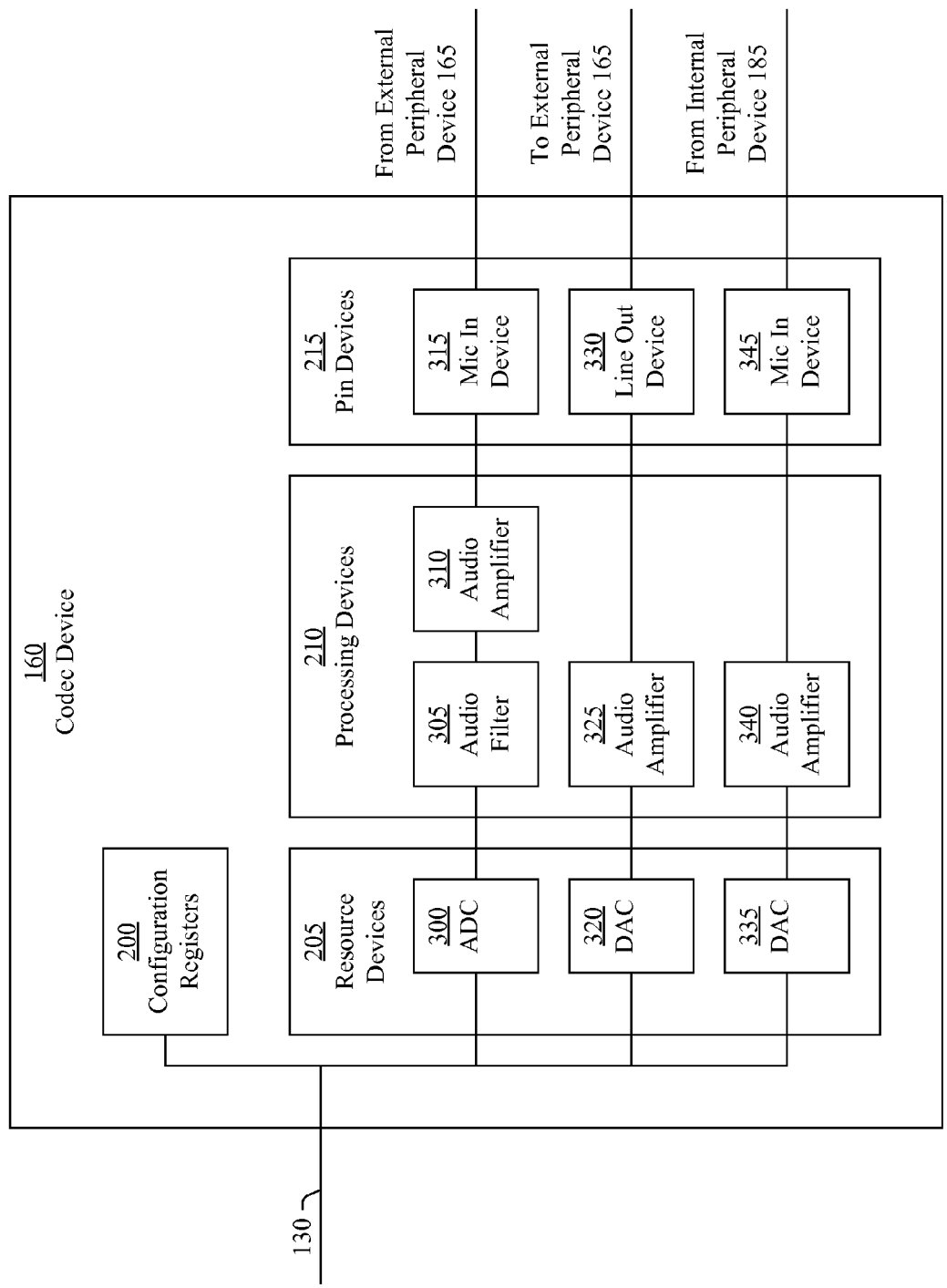
FIG. 3 is a block diagram of a codec device, in accordance with an embodiment of the present invention.

FIG. 3 illustrates the codec device 160, in accordance with an embodiment of the present invention. The codec device 160 illustrated in FIG. 3 is an exemplary embodiment of an audio codec device in compliance with the HDA. The resource devices 205 include an analog-to-digital converter (ADC) 300, a digital-to-analog converter (DAC) 320, and a digital-to-analog converter (DAC) 335. The processing devices 210 include an audio filter 305, an audio amplifier 310, an audio amplifier 325, and an audio amplifier 340. The pin devices 215 include a microphone input device (mic in device) 315, a line output device (line out device) 330, and a microphone input device (mic in device) 345. As may be envisioned from FIG. 3, the computing processor 115 has configured the codec device 160 by writing the configuration data 135 into the configuration registers 200. In this way, the computing processor 115 has configured functions of the pin devices 215, connectivity between the resource devices 205 and some of the processing devices 210, connectivity among some of the processing devices 210, and connectivity between some of the processing devices 210 and the pin devices 215.

As is also illustrated in FIG. 3, the analog-to-digital converter 300 is connected to the audio filter 305, the audio filter 305 is connected to the audio amplifier 310, and the audio amplifier 310 is connected to the microphone input device 315, which forms an audio data path in the codec device 160. The digital-to-analog converter 320 is connected to the audio amplifier 325 and the audio amplifier 325 is connected to the line output device 330, which forms an audio data path in the codec device 160. The digital-to-analog converter 335 is connected to the audio amplifier 340 and the audio amplifier 340 is connected to the microphone input device 345, which forms an audio data path in the codec device 160. Additionally, the microphone input device 315 is connected to an external peripheral device 165, the line output device 330 is connected to an external peripheral device 165, and the microphone input device 345 is connected to an internal peripheral device 185.

Figure 4:
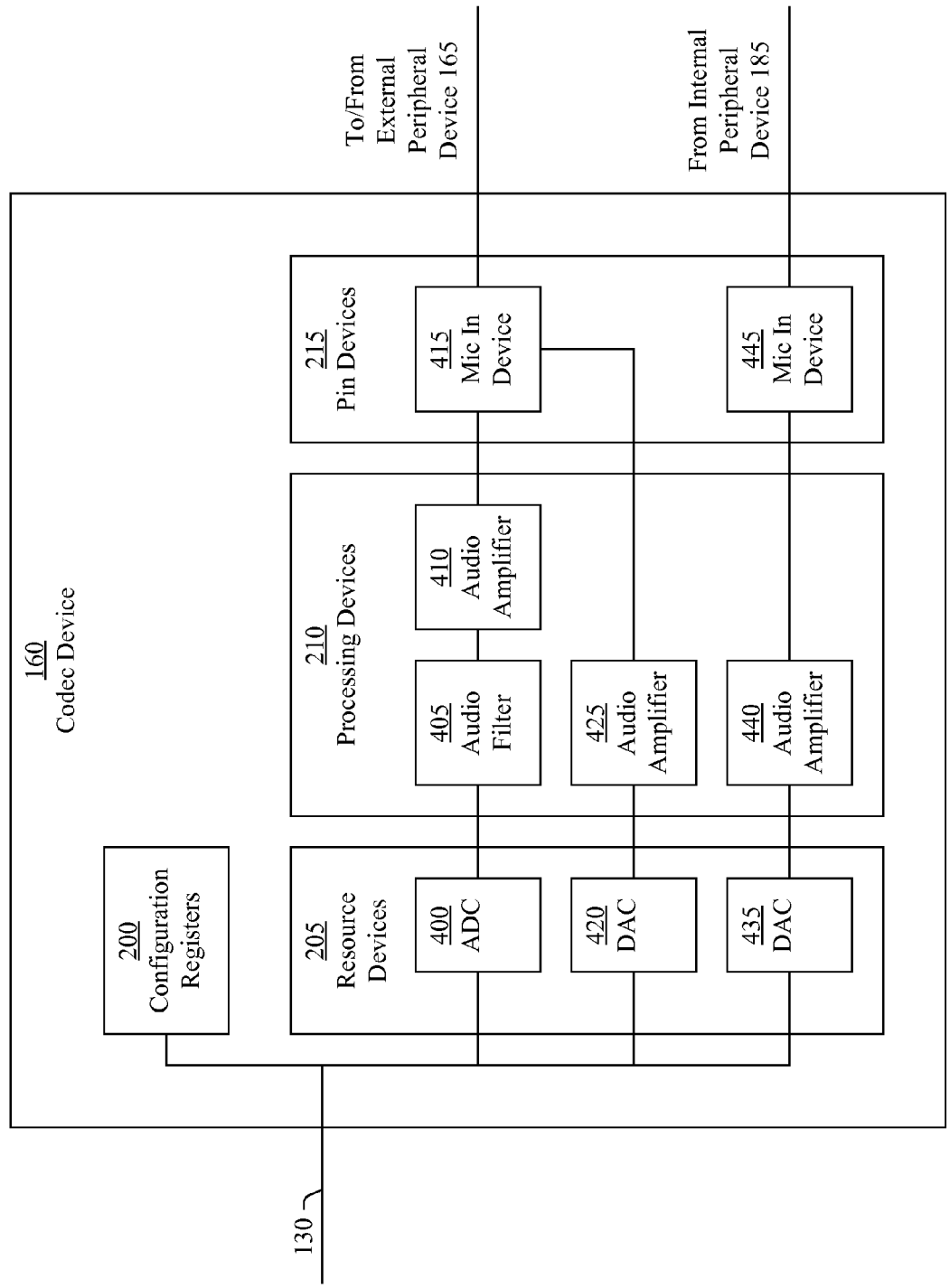
FIG. 4 is a block diagram of a codec device, in accordance with an embodiment of the present invention.

FIG. 4 illustrates the codec device 160, in accordance with an embodiment of the present invention. The codec device 160 illustrated in FIG. 4 is an exemplary embodiment of an audio codec device in compliance with the HDA, as is described more fully herein.

The resource devices 205 include an analog-to-digital converter (ADC) 400, a digital-to-analog converter (DAC) 420, and a digital-to-analog converter (DAC) 435. The processing devices 210 include an audio filter 405, an audio amplifier 410, an audio amplifier 425, and an audio amplifier 440. The pin devices 215 include a microphone input device (mic in device) 415 and a microphone input device (mic in device) 445. As may be envisioned from FIG. 4, the computing processor 115 has configured the codec device 160 by writing the configuration data 135 into the configuration registers 200. In this way, the computing processor 115 has configured functions of the pin devices 215, connectivity between the resource devices 205 and some of the processing devices 210, connectivity among some of the processing devices 210, and connectivity between some of the processing devices 210 and the pin devices 215.

As is also illustrated in FIG. 4, the analog-to-digital converter 400 is connected to the audio filter 405, the audio filter 405 is connected to the audio amplifier 410, and the audio amplifier 410 is connected to the microphone input device 415, which forms an audio data path in the codec device 160. The digital-to-analog converter 420 is connected to the audio amplifier 425 and the audio amplifier 425 is connected to the microphone input device 415, which forms another audio data path in the codec device 160 containing the microphone input device 415. Although the codec device 160 includes two audio paths including the microphone input device 415 (i.e., a default data path and an alternative data path), which is not specified in the HDA, the computing processor 115 executes the BIOS 120 to configure the microphone input device 415 for one of the data paths (i.e., the default data path) based on the configuration data 135 such that the codec device 160 is in compliance with HDA. As is also illustrated in FIG. 4, the digital-to-analog converter 435 is connected to the audio amplifier 440 and the audio amplifier 440 is connected to the microphone input device 445, which forms an audio data path in the codec device 160. Additionally, the microphone input device 415 is connected to an external peripheral device 165 and the microphone input device 445 is connected to an internal peripheral device 185.

In this embodiment, the computing processor 115 executes the device driver 140 to enable the alternative audio data path including the microphone input device 415 and an alternative function of the microphone input device 415. For example, the default function of the microphone input device 415 may be to receive an audio stream from an external microphone and the alternative function of the microphone input device 415 may be to output an amplified audio data stream from the audio amplifier 425 to an external speaker system. In this way, the device driver 140 extends the functionality of the HDA, which does not specify a mechanism for supporting multiple functions of a pin device 215, such as a line in function and an audio out function of the pin device 215.

Figure 5:
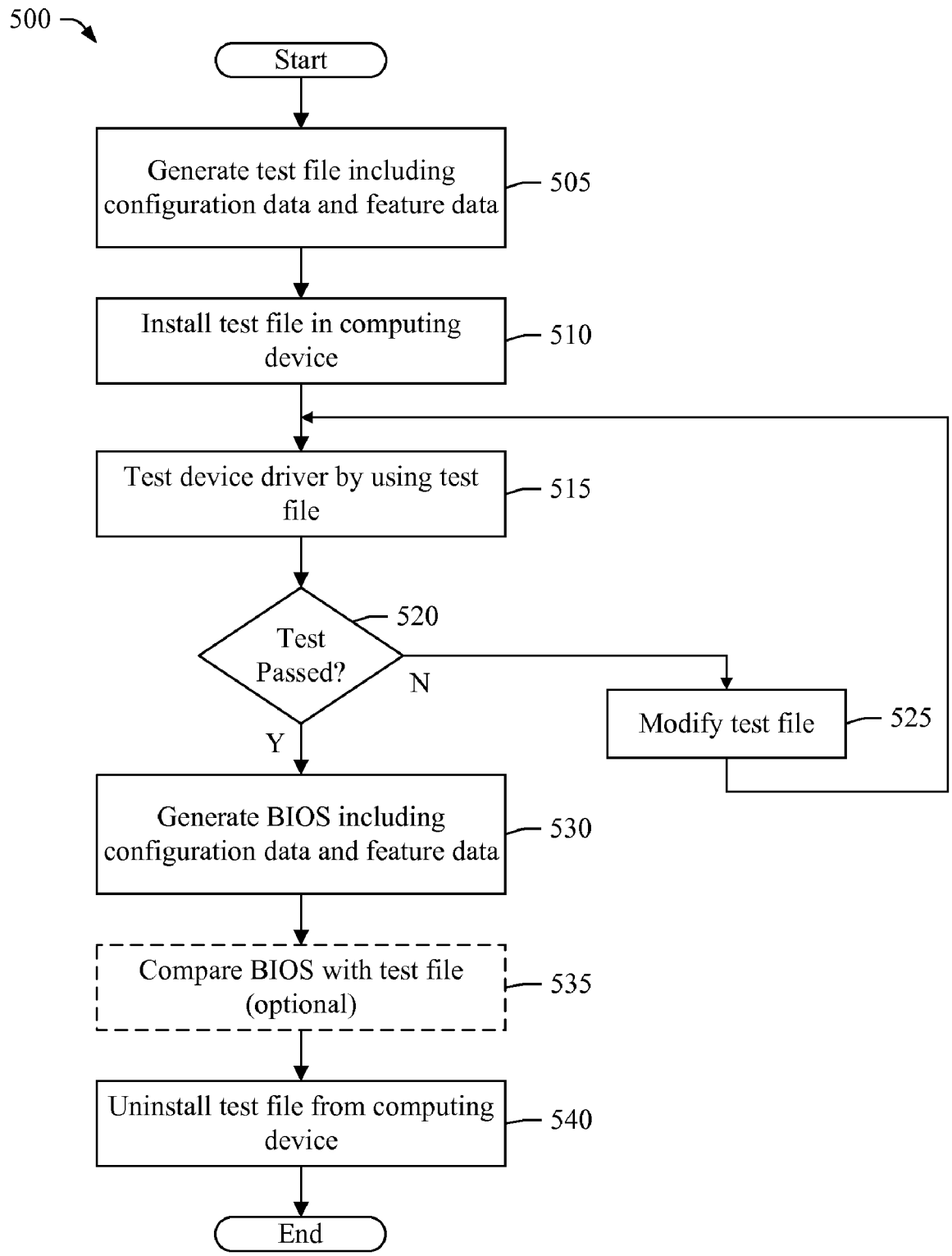
FIG. 5 is a flow chart of a method of testing a device driver for enabling a feature of a codec device, in accordance with an embodiment of the present invention.

FIG. 5 illustrates a method 500 of testing a device driver for enabling a feature of a codec device, in accordance with an embodiment of the present invention. In step 505, a test file is generated including both configuration data and feature data for a codec device. In various embodiments, the test file 180 is generated including both the configuration data 135 and the feature data 150 for the codec device 160. In some embodiments, a user of the computing device 105, such as a system designer, runs the test file generator 175 on the computing system 100 to generate the test file 180 including the configuration data 135 and the feature data 150. In this way, the test file generator 175 generates the test file 180 based on input from the user. The method 500 then proceeds to step 510.

In step 510, the test file is installed in the computing device. In various embodiments, the test file 180 is installed in the computing device 105. For example, a user of the computing device 105, such as a system designer of the computing device 105, may provide the test file 180 to the computing device 105. In turn, the computing processor 115 of the computing device 105 installs the test file 180 in the computing device 105 by writing the configuration data 135 and the feature data 150 into the memory system 110 of the computing device 105. As another example, a user of the computing device 105, such a system designer of the computing device 105, may run the test file generator 175 to install the test file 180 in the computing device 105. In this way, the test file generator 175 installs the test file 180 in the computing device 105 by writing the configuration data 135 and the feature data 150 into the memory system 110 of the computing device 105. The method 500 then proceeds to step 515.

In step 515, the device driver is tested by using the test file. In various embodiments, the device driver 140 is tested by using the test file 180. In this process, the device driver 140 reads the configuration data 135 from the test file 180 and configures the codec device 160 based on the configuration data 135. The device driver 140 then reads the feature data 150 from the test file 180 and enables a feature of the codec device 160 based on the feature data 150. In further embodiments, the device driver 140 tests the feature of the codec device 160. The method 500 then proceeds to step 520.

In step 520, it is determined whether the test of the device driver passed or failed. In various embodiments, it is determined whether the test of the device driver 140 passed or failed. In some embodiments, the device driver 140 determines whether the test of the device driver 140 passes or fails. For example, the device driver 140 may indicate the test passes if the device driver 140 determines the feature of codec device 160 is operating according to specification and may indicate the test fails if the device driver 140 determines the feature of the codec device 160 is not operating according to specification.

In other embodiments, the software component 155 or the application program 170, or both, operate in conjunction with the device driver 140 to determine whether the test of the device driver 140 passed. In these embodiments, the software component 155 or the application program 170 indicates whether the test of the device driver 140 passes or fails. If the test of the device driver 140 failed, the method 500 proceeds to step 525, otherwise if the test of the device driver 140 passed, the method 500 proceeds to step 530.

In step 525, arrived at from the determination in step 520 that the test of the device driver failed, the test file is modified. In various embodiments, the test file 180 is modified. For example, a user of the computing device 105, such as a system designer of the computing device 105, may run the test file generator 175 on the computing system 100 to modify the test file 180. In this way, the test file generator 175 modifies the test file 180 based on input from the user. The method 500 then returns to step 515.

In step 530, arrived at from the determination in step 520 that the test of the device driver passed, a basic input-output system (BIOS) including the configuration data and the feature data is generated. In various embodiments, the BIOS 120 including the configuration data 135 and the feature data 150 is generated by generating computing code (e.g., source code or binary code) for the BIOS 120 including the configuration data 135 and the feature data 150 and compiling the source code into binary code. For example, a user of the computing system 100 may run the test file generator 175 to generate the source code or the binary code for the BIOS 120. In this process, the test file generator 175 program generates the BIOS 120. As another example, a user of the computing system 100 may run the test file generator 175 to generate the source code for the BIOS 120 and then run a compiler to generate the binary code for the BIOS 120. The method 500 then proceeds to step 535.

In optional step 535, the BIOS is compared with the test file. In various embodiments, the configuration data 135 and the feature data 150 in the BIOS 120 are compared with the configuration data 135 and the feature data 150 in the test file 180. In some embodiments, the device driver 140 compares the configuration data 135 and the feature data 150 in the BIOS 120 with the configuration data 135 and the feature data 150 in the test file 180. If the device driver 140 determines the configuration data 135 and the feature data 150 in the BIOS 120 is the same as the configuration data 135 and the feature data 150 in the test file 180, the device driver 140 the BIOS 120 is deemed to be validated. In this way, the device driver 140 validates the BIOS 120.

In some embodiments, the device driver 140 detects presence of the test file 180 in the computing device 105 by determining the test file 180 is stored in the memory system 110. Additionally, the device driver 140 provides a notification indicating the test file 180 is stored in the computing device 105. For example, the device driver 140 may generate a notification on a display device of the computing device 105 indicating the test file 180 is stored in the computing device 105. In various embodiments, the notification identifies the test file 180 or indicates the result of the comparison between the BIOS 120 and the test file 180, or both. In some embodiments, the notification indicates the configuration data 135 or the feature data 150, or both. In some embodiments, the notification indicates features of the codec device 160 that may be enabled based on the feature data 150. In other embodiments, the software component 155 (e.g., middleware) or the application program 170 operates in conjunction with the device driver 140 to display the notification. The method 500 then proceeds to step 540.

In step 540, the test file is uninstalled from the computing device. In various embodiments, the test file 180 is uninstalled from the computing device 105. For example, a user of the computing device 105, such as a system designer of the computing device 105, may uninstall the test file 180 from the computing device 105 by executing an uninstall script on the computing device 105. In this way, the uninstall script uninstalls the test file 180 from the computing device 105 based on user input. The method 500 then ends.

In various embodiments, the method 500 may include more or fewer than the steps 505-540 illustrated in FIG. 5 and described above. In some embodiments, the steps 505-540 of the method 500 may be performed in a different order than the order illustrated in FIG. 5 and described above. In some embodiments, some of the steps 505-540 of the method 500 may be performed in parallel or substantially simultaneously. In various embodiments, one or more of the steps 505-540 may be performed more than once in the method 500.

Figure 6:
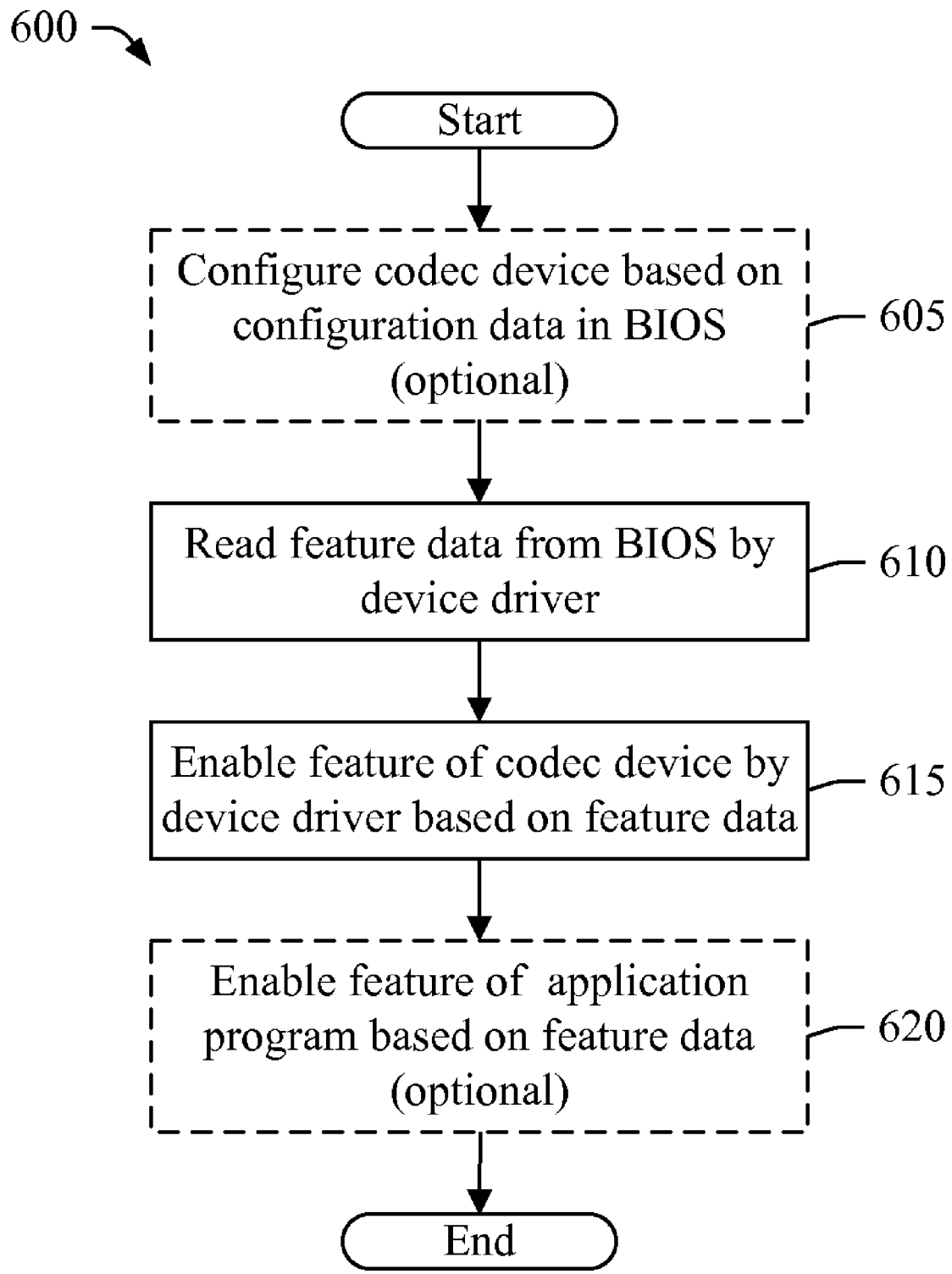
FIG. 6 is a flow chart of a method of enabling a feature of a codec device, in accordance with an embodiment of the present invention.

FIG. 6 illustrates a method 600 of enabling a feature of a codec device, in accordance with an embodiment of the present invention. In various embodiments, the method 600 is part of the method 500 illustrated in FIG. 5 and follows step 540 of the method 500. In step 605, a codec device is configured based on configuration data in a BIOS. In various embodiments, the codec device 160 is configured based on the configuration data 135 in the BIOS 120. In some embodiments, the computing processor 115 executes the BIOS 120 to configure the codec device 160 based on the configuration data 135 in the BIOS 120. In this way, the BIOS 120 configures the codec device 160. The method 600 then proceeds to step 610.

In step 610, feature data is read from the BIOS. In various embodiments, the feature data 150 is read from the BIOS 120. In some embodiments, the computing processor 115 executes the device driver 140, for example upon startup of the computing device 105, to read the feature data 150 from the BIOS 120. In this way, the device driver 140 reads the feature data 150 from the BIOS 120. The method 600 then proceeds to step 615.

In step 615, a feature of the codec device is enabled based on the feature data. In various embodiments, a feature of the codec device 160 is enabled based on the feature data 150. In various embodiments, the computing processor 115 executes the device driver 140 to enable the feature of the codec device 160. In this way, the device driver 140 enables the feature of the codec device 160 based on the feature data 150. The method 600 then proceeds to step 620.

In optional step 620, a feature of an application program is enabled based on the feature data. In various embodiments, a feature of the application program 170 is enabled based on the feature data 150. In various embodiments, the device driver 140 enables the feature of the application program 170 by generating application data based on the feature data 150 and writing the application data to the software component 155 of the computing device 105. In turn, the application program 170 accesses the application data from the software component 155 and enables the feature in the application program 170. The method 600 then ends.

In various embodiments, the method 600 may include more or fewer than the steps 605-620 illustrated in FIG. 6 and described above. In some embodiments, the steps 605-620 of the method 600 may be performed in a different order than the order illustrated in FIG. 6 and described above. In some embodiments, some of the steps 605-620 of the method 600 may be performed in parallel or substantially simultaneously. In various embodiments, one or more of the steps 605-620 may be performed more than once in the method 600.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A computing system comprising:
a codec device;
a memory system configured to store a basic input-output system including both configuration data for the codec device and feature data for the codec device, the memory system further configured to store a certified device driver for the codec device, wherein the feature data for the codec device comprises at least one feature that is not included in the certified device driver of the codec device;
a computing processor coupled to the codec device and the memory system for executing the basic input-output system and the certified device driver, the basic input-output system configured to configure the codec device based on the configuration data, the certified device driver configured to read the feature data from the basic input-output system and to enable the at least one feature that is not included in the certified device driver of the codec device based on the feature data, and
wherein the at least one feature is a feature of an application program that performs audio processing functions, the memory system further configured to store a software component and the application program, the certified device driver configured to store application data based on the feature data, and the application program further configured to access the application data and enable a feature of the application program that is related to the operation of the codec device.

2. The computing system of claim 1, wherein the codec device comprises a pin device and the configuration data for the codec device specifies a single default configuration for each pin device of the codec device, the feature data for the codec device including a different default configuration for at least one pin device of the codec device, the memory system further configured to store a certified device driver for the codec device that does not include the different default configuration for the at least one pin device of the codec device, the basic input-output system is further configured to configure the codec device by enabling the single default configuration of the pin device, and the certified device driver is further configured to enable the different default configuration for the at least one pin device of the codec device using the feature data.

3. The computing system of claim 1, wherein the application program includes a graphical user interface including a control panel, the feature of the application program is a skin for the control panel, and the application data includes default configuration data for controls in the control panel.

4. The computing system of claim 1, wherein the feature of the application program includes default configuration data for the application program.

5. The computing system of claim 1, wherein the software component comprises registry keys in a Windows operating system.

6. The computing system of claim 1, wherein the memory system is further configured to store an operating system including the device driver, the software component comprises an operating system interface for facilitating communication between the operating system and the certified device driver, and the application program is further configured to access the application data through the operating system interface for enabling the feature of the application program.

7. The computing system of claim 6, wherein the operating system interface is an ioctl.

8. A method of enabling a feature of a codec device, the method comprising:
configuring a codec device based on configuration data of a basic input-output system;
reading feature data from the basic input-output system by a certified device driver, wherein the feature data for the codec device comprises at least one feature that is not included in the certified device driver of the codec device;
writing application data to a software component that comprises registry keys in a Windows operating system based on the feature data;
accessing the application data in the software component; and
enabling at least one feature of an application program that performs audio processing functions that is not included in the certified device driver of the codec device by the certified device driver based on the application data accessed in the software component, the feature of the application program related to the operation of the codec device.

9. The method of claim 8, wherein the codec comprises a pin device, configuring the codec based on the configuration data comprises enabling a function of the pin device based on the configuration data, and enabling the at least one feature that is not included in the certified device driver of the codec device comprises enabling an alternative function of the pin device based on the feature data.

10. The method of claim 8, wherein the application program comprises a graphical user interface including a control panel and the feature of the application program is a skin for the control panel.

11. The method of claim 8, wherein the feature of the application is a logo and the application program is configured to display the logo.

12. The method of claim 8, wherein the feature of the application program includes default configuration data for the application program.

13. A method of enabling a feature of a codec device, the method comprising:
configuring a codec device based on configuration data of a basic input-output system;
reading feature data from the basic input-output system by a certified device driver, wherein the feature data for the codec device comprises at least one feature that is not included in the certified device driver of the codec device; and
writing application data to a software component that comprises an operating system interface that is an ioctl based on the feature data;
accessing the application data in the software component through the operating system interface; and
enabling at least one feature of an application program of an application program that performs audio processing functions that is not included in the certified device driver of the codec device by the certified device driver based on the application data accessed in the software component, the feature of the application program related to the operation of the codec device.

14. A non-transitory computer readable media comprising computing instructions readable by a computing system including a basic input-output system and a codec device, the computing instructions executable by the computing system to perform the method of:
configuring the codec device based on the configuration data in the basic input-output system;
reading feature data for the codec device from the basic input-output system by a certified device driver of the codec device, wherein the feature data for the codec device comprises at least one feature that is not included in a certified device driver of the codec device;
writing application data to a software component based on the feature data;
accessing the application data in the software component; and
enabling at least one feature of an application program that performs audio processing functions that is not included in the certified device driver of the codec device by the certified device driver based on the application data accessed in the software component, the feature of the application program related to the operation of the codec device.

15. The non-transitory computer readable media of claim 14, wherein the method further comprises:
generating a test file including computing code for the basic input-output system, the computing code of the basic input-output system including both configuration data and feature data for the codec device wherein the feature data for the codec device comprises at least one feature that is not included in a certified device driver of the codec device; and
testing the device driver by emulating the basic input-output system based on the configuration data in the test file to configure the codec device and by enabling the at least one feature that is not included in the certified device driver of the codec device based on the feature data in the test file.

16. The non-transitory computer readable media of claim 15, wherein the method further comprises:
generating the basic input-output system including both the configuration data and the feature data; and
comparing the configuration data and the feature data in the basic input-output system with the configuration data and the feature data in the test file by the certified device driver.

17. The non-transitory computer readable media of claim 14, wherein the computing instructions include the certified device driver.

* * * * *